US009489952B2

(12) United States Patent
Dicillo et al.

(10) Patent No.: US 9,489,952 B2
(45) Date of Patent: Nov. 8, 2016

(54) WAGERING GAME HAVING SEAMLESS LOOPING OF COMPRESSED AUDIO

(71) Applicant: WMS Gaming Inc., Waukegan, IL (US)

(72) Inventors: Michael V. Dicillo, Chicago, IL (US); Joseph G. Marcus, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 263 days.

(21) Appl. No.: 14/317,180

(22) Filed: Jun. 27, 2014

(65) Prior Publication Data

US 2015/0072778 A1 Mar. 12, 2015

Related U.S. Application Data

(60) Provisional application No. 61/876,397, filed on Sep. 11, 2013.

(51) Int. Cl.

| | |
|---|---|
| ***G06F 17/00*** | (2006.01) |
| ***G10L 19/00*** | (2013.01) |
| ***G07F 17/32*** | (2006.01) |

(52) U.S. Cl.
CPC .......... *G10L 19/00* (2013.01); *G07F 17/3204* (2013.01)

(58) Field of Classification Search
USPC .................................................. 463/16-29
See application file for complete search history.

(56) References Cited

U.S. PATENT DOCUMENTS 6,931,370 B1 8/2005 McDowell
8,170,882 B2 * 5/2012 Davis .................... G10L 19/008 381/20
8,407,059 B2 * 3/2013 Cho ...................... G10L 19/008 370/487
9,008,810 B2 * 4/2015 Hatanaka ............ G10L 19/0019 700/94

OTHER PUBLICATIONS

CompuPhase; Gapless Looping MP3 Tracks; Downloaded from website http://www.compuphase.com/mp3/mp3loops.htm; Downloaded on Jul. 11, 2013 (7 pages).

* cited by examiner

*Primary Examiner* — Ronald Laneau
(74) *Attorney, Agent, or Firm* — Nixon Peabody LLP

(57) ABSTRACT

Gapless looping playback of an audio sound seamlessly without any silence between loops. An uncompressed digital audio file is divided and encoded using an MP3 encoder to produce two encoded files, A and B. The MP3 encoder adds a padding delay at the beginning and end of each file. Two timers are defined: T1=A−(a+b) and T2=B−(d+c), where a is the padding delay at the end of A, b is the delay at the beginning of B, c is the delay at the beginning of A, and d is the delay at the end of B. Simultaneously, a decoder starts to decode A on Track 1 and T1 is started. Immediately after T1 expires, a decoder starts to decode B on Track 2 and T2 is started. Thanks to the timers, the respective end and beginning of the sound portions of A and B temporally align so that no silence is heard.

21 Claims, 6 Drawing Sheets

WAGERING GAME HAVING SEAMLESS LOOPING OF COMPRESSED AUDIO

CROSS-REFERENCE TO RELATED APPLICATION

This application claims the benefit of U.S. Provisional Patent Application No. 61/876,397, filed Sep. 11, 2013, and is incorporated herein by reference in its entirety and for all purposes.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and methods for playing wagering games, and more particularly, to a wagering game in which a bonus event is triggered, revealing a bonus award show during which bonus awards are eliminated, one at a time, until the winning bonus award is revealed.

BACKGROUND OF THE INVENTION

When an MP3 (MPEG Audio Layer III) file is being decoded and played back on audio speakers in a looping pattern, there is a perceptible silence that can be heard between the end of the audio content and when the digital audio music player loops back to play the beginning of the audio content. This silence is a byproduct of the encoding process to convert an audio file into an encoded MP3 format. The original audio file is divided into equally sized frames containing 1152 samples, and then the MP3 encoder adds silence to the beginning and end of the file to make the resulting encoded MP3 file into an integer number of frames, each containing exactly 1152 samples. Even if the original audio file is evenly divisible by 1152 samples into an even number of frames, the MP3 encoding process still adds a certain amount of padding known as encoder/decoder delay. These "pads" are what prevent the MP3 file from looping seamlessly without any audibly perceptible added silence between each loop.

This silence is particularly noticeable when the MP3 files are being decoded through a web browser where no back-end software exists to "reassemble" a file so it sounds seamless from one loop to another. Adobe's FLASH encoder is platform-specific and requires the client to install a proprietary software component to play audio content. Another problem with this process is that it is not sample-locked and therefore tends to drift, thus causing audible pops and hiccups during playback.

Other solutions exist that try to create gapless looping MP3 tracks, but these solutions require software applications or plugins to be installed outside of the web browser on the client device. For example, they require extensive preparation or manipulation of the original audio file, installation of one or more utility or encoder programs, and/or multiple encoding steps. Even still, during the first playback, a gap will be present.

In some environments, having gaps of silence between looping audio playback is extremely undesirable. It is aurally distracting and can detract from the user experience. For example, in a wagering game, having a gapless looping audio sound is very important for creating an exciting multi-sensory experience, which relies on visual and audible, and sometimes haptic or tactile, cues to create an exciting and immersing environment for the player.

SUMMARY OF THE INVENTION

Aspects of the present disclosure do not require any extra software, plugins, or specific encoders to be installed on a client device, and instead call for relatively minor audio file preparation and determination of the temporal length of "padding" gaps added during the encoding process, combined with timers to cover the gaps.

In one example, a raw audio file, such as a .WAV file, having no padding at the beginning or the end of the file is provided. The raw audio file if played directly would otherwise loop seamlessly on its own without any audio gaps being perceived from playback of the end of the audio content back to the beginning. The raw audio file is divided into two equally sized files to eliminate any possibility of timer drift.

The two files are conventionally encoded using an MP3 encoder to produce two encoded files. Because of the encoding process, a padding delay will be introduced at the beginning and end of each file. The amount of padding delay added to the beginning and end of each of the encoded files is determined. For convenience, the padding delay at the beginning of the first encoded file is called c (in ms), and the padding delay added at the end of the first encoded file is called a. Likewise, the padding delay added at the beginning of the second encoded file is called b, and the padding delay added at the end of end of the second encoded file is called d.

Two timers are defined as follows:

$$T1=A-(a+b) \quad \text{Timer 1}$$

$$T2=B-(c+d) \quad \text{Timer 2}$$

Where A represents the total playback (decoding) time of the first encoded file from its beginning to end, and B represents the total playback (decoding) time of the second encoded file from its beginning to end. Timer 1 can be viewed as the timer for the second file, because the second file "waits" until Timer 1 has expired to begin decoding. Likewise, Timer 2 can be viewed as the timer for the first file, because the first file "waits" until Timer 2 has expired to begin decoding. Each time the audio file is called for playback, the timers are reset. Optimally, the sooner the timer is reset, the less chance for timer drift. Thus, the larger the raw audio file, the more times it can be divided into smaller chunks so that the timers can be reset after a short period of time.

A very brief exemplary code summation of the procedure described above is summarized below:

```
Start Loop
Play MP3 file A
Wait T1 ms
Play MP3 file B
Wait T2 ms
Back to start of loop
```

For MP3 file A, the variables c and a represent the "padding" the MP3 encoding process adds. For MP3 file B, the variables b and d represent the "padding" the encoding process adds.

Aspects of the present disclosure relate to seamless, gapless looping of compressed audio files, such as MP3 files, in a web browser. These aspects can, though not necessarily, be applied to a wagering game conducted on a standalone gaming terminal or a virtual wagering game played using a web browser interface.

Additional aspects of the present disclosure will be apparent to those of ordinary skill in the art in view of the detailed description of various embodiments, which is made with reference to the drawings, a brief description of which is provided below.

DETAILED DESCRIPTION

Figure 1:
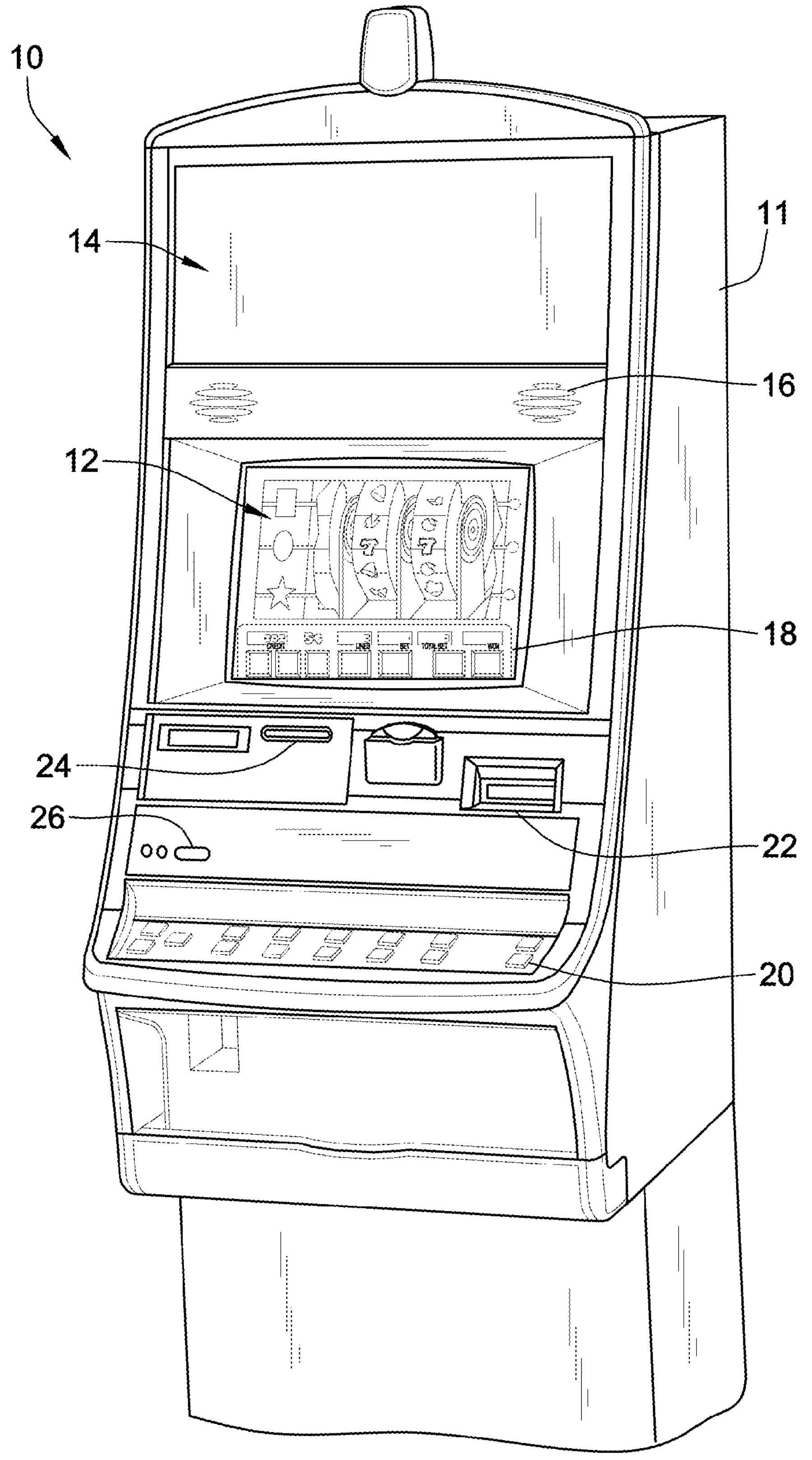
FIG. 1 is a perspective view of a free-standing gaming terminal according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, titled "Reel Spinning Slot Machine With Superimposed Video Image," U.S. Patent Application Publication Nos. US2010/0069160, titled "Handheld Wagering Game Machine And Docking Unit," and US2010/0234099, titled "Wagering Game System With Docking Stations" which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
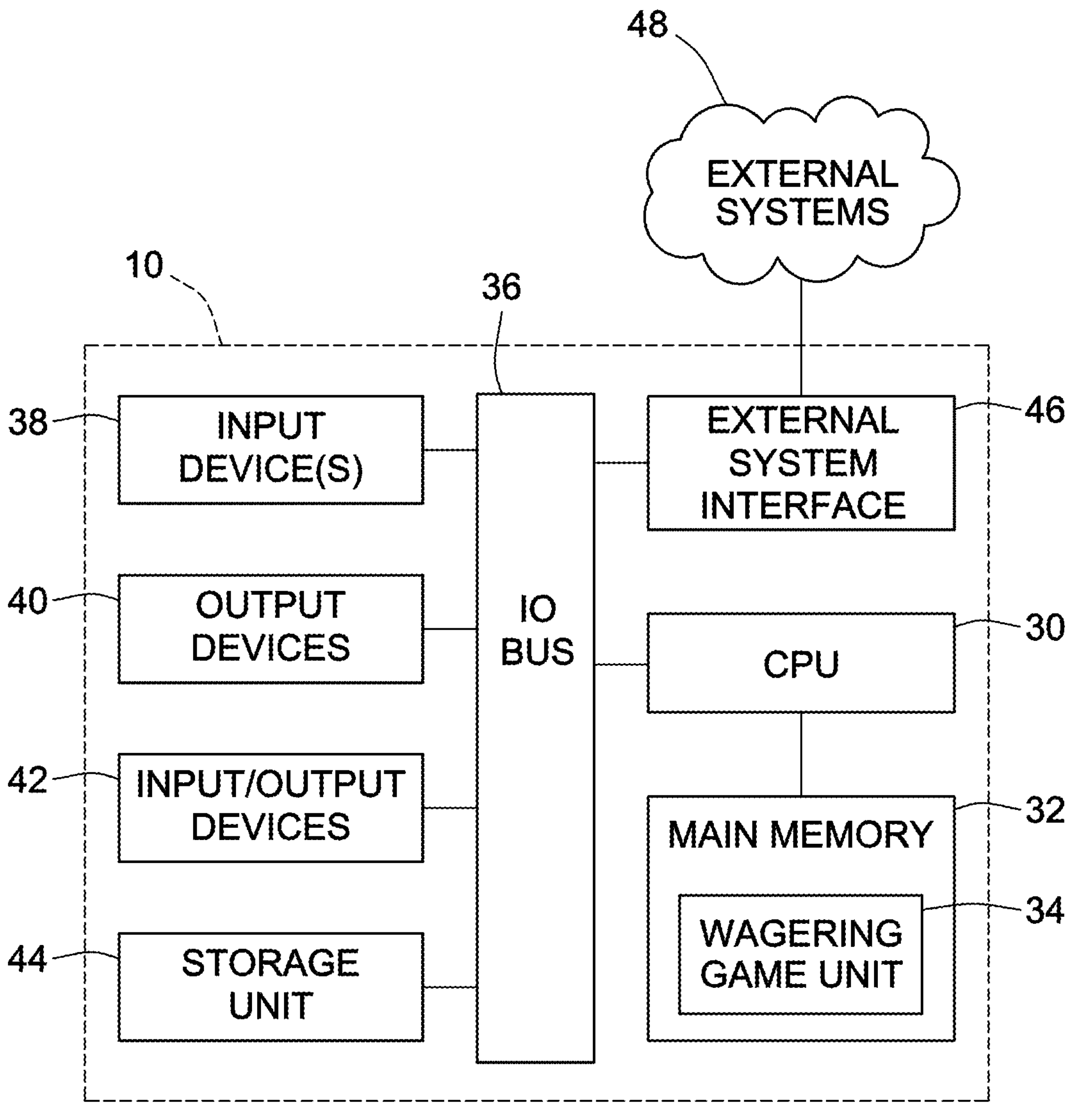
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a non-transitory main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The non-transitory main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible, non-transitory machine-readable storage media including instructions for performing the operations described herein. Non-transitory machine-readable storage media includes any mechanism that stores information and provides the information in a form readable by a machine (e.g., gaming terminal, computer, etc.). For example, non-transitory machine-readable storage media includes read only memory (ROM), random access memory (RAM), magnetic disk storage media, optical storage media, flash memory, etc.

Figure 3:
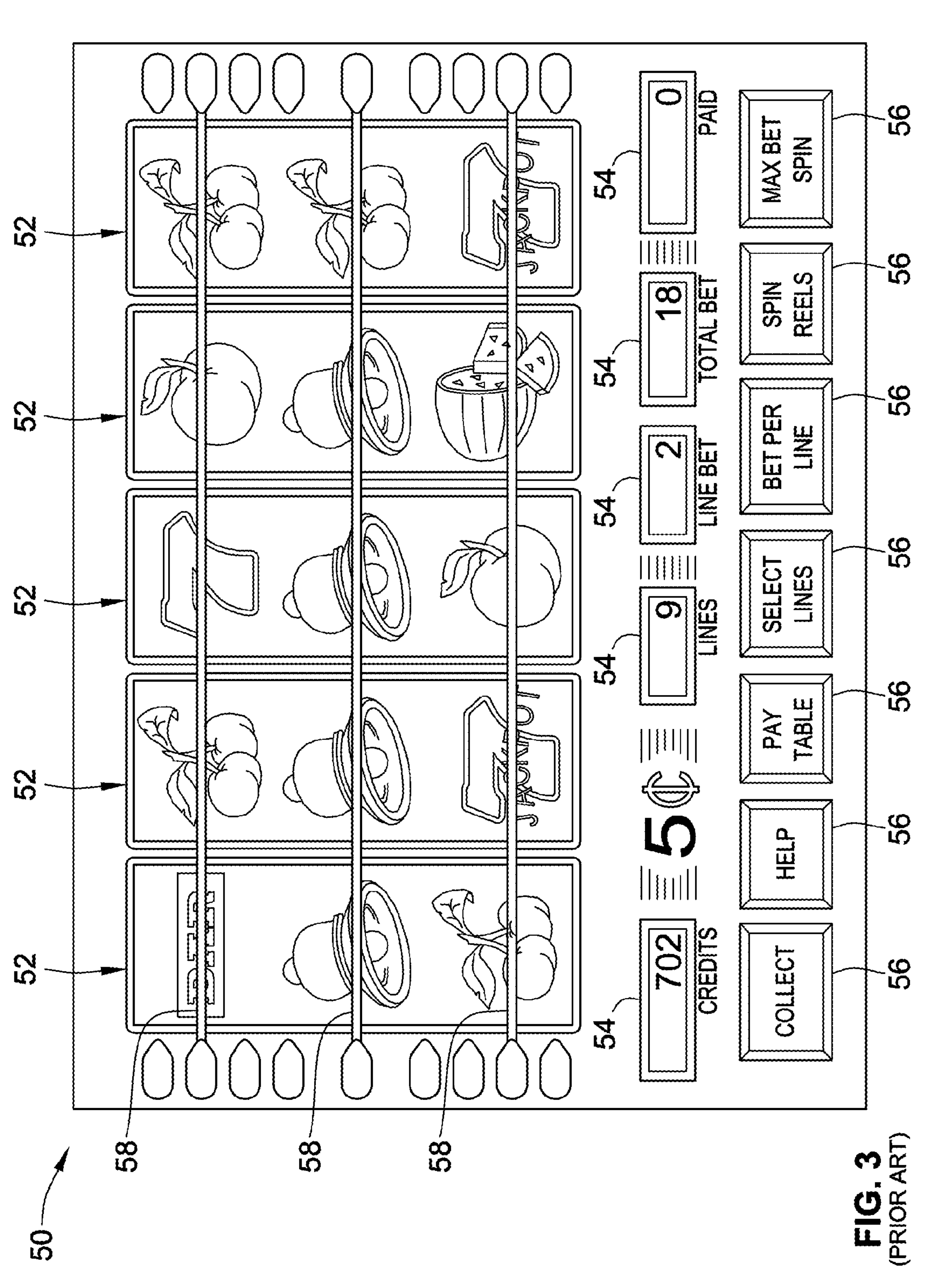
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile, non-transitory semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
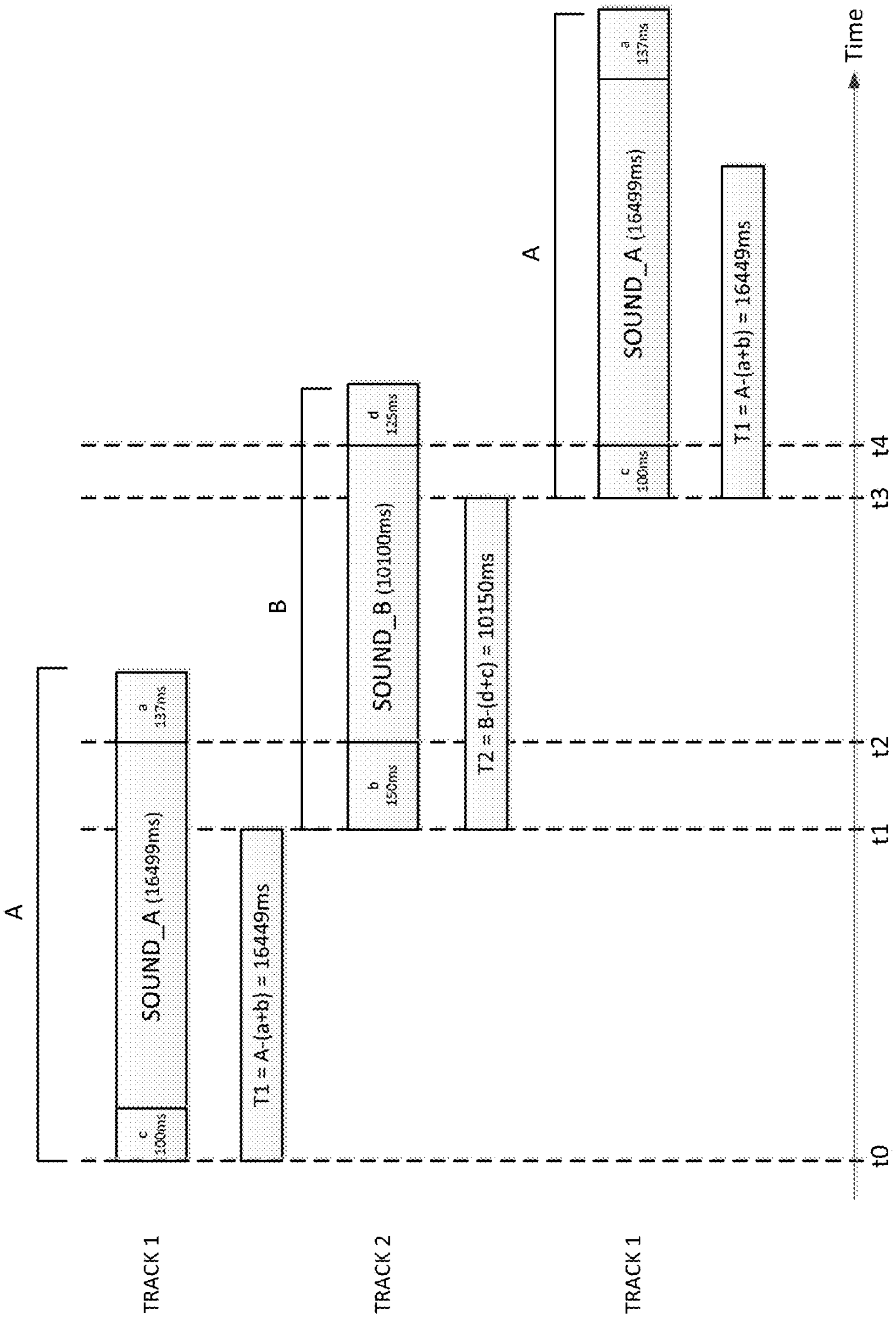
FIG. 4 is an exemplary timing diagram showing a timing sequence of decoding two encoded digital audio files to achieve a seamless, gapless looping playback.

FIG. 4 illustrates an exemplary timing sequence in which two portions of an encoded audio file are decoded such that when they are played through speakers, they produce a seamless, gapless looping of the audio sound encoded in the audio file. A raw digital audio file in a digital audio format is provided, such as in a Waveform Audio File Format (WAV), an Audio Interchange File Format (AIFF), the Free Lossless Audio Codec (FLAC) format, or the like. The raw digital audio file can be in a lossless or lossy, uncompressed or compressed digital audio format. By "raw," it is meant that the digital audio file is uncompressed, though it can be compressed, and can be un-encoded. Preferably, but not necessarily, the audio or sound content in this file if played on a suitable audio player in a playback loop would not produce any gaps of audio silence between loops. Due to the file size of such raw digital audio files, it is not desirable to play these audio files over the Internet through a web browser.

The digital audio file is divided into two or more portions. As explained in the summary section above, this division reduces the sizes of the files and eliminates timer drift, which can cause audible pops or hiccups that have plagued prior-art gapless looping solutions. While the present disclosure is not limited to the wagering game context, when used in a wagering game environment, the seamless, gapless looping sound produced by following the teachings of the present disclosure is very well-suited for wagering games because players cannot tolerate audio gaps, pops, hiccups, or other audible anomalies that will detract from their gaming experience. Wagering games invoke multiple senses by the player, and exploit sound as one tool for building excitement in the player, thus immersing the player in a rich and robust experience.

In this example for ease of discussion, the digital audio file is divided into two portions. It should be emphasized that depending upon the size of the digital audio file, it may be divided into three or more portions. The two portions are encoded separately, to produce a first encoded portion and a second encoded portion. The two encoded portions can be encoded according to a lossy, compressed digital audio format, such as the MP3 format or the Ogg Vorbis format. The present disclosure applies to any audio encoding format that introduces silence into the audio content as a byproduct of the encoding process.

Using a conventional sound editing software application, the amount of delay added to the beginning and the end of each of the two encoded portions can be determined. The amplitude of the sound in each of the delay sections will be zero, so the ordinarily skilled person can readily measure the zero-amplitude delay added by the encoder. The person of ordinary skill in the sound engineering art can readily appreciate that there are other ways of determining or calculating the padding delays added at the beginning and end of an encoded audio file. For example, a software application can calculate the amount of zero-amplitude sound at the beginning and end of an encoded audio file and store these padding delays as variables in a non-transitory storage medium. An encoder can be easily modified to store, for example as metadata, the amount of padding delays added during the encoding process. The delays, however determined, are stored in a non-transitory storage medium as variables. For convenience, the time delay introduced at the beginning of the first encoded portion of the digital audio file will be referred to as the variable "c." The time delay appended at the end of the first encoded portion of the digital audio file will be referred to as the variable "a." Likewise, the time delay introduced at the beginning of the second encoded portion of the digital audio file will be referred to as the variable "b." The time delay appended at the end of the second encoded portion of the digital audio file will be referred to as the variable "d."

FIG. 4 illustrates two exemplary encoded portions, labeled A and B in capital letters, and their corresponding padding delays. Thus, the first encoded portion, A, has a beginning or initial delay, c, that lasts 100 ms starting, and an end or terminal delay, a, that lasts 137 ms. These exemplary values are completely arbitrary and are being used for ease of discussion, and may not be representative of the actual delay values produced by an encoded. The actual sound or audio content of the first encoded portion A has a time duration of 16.499 seconds, and is labeled SOUND_A. Thus, A=c+SOUND_A+a.

Similarly, the second encoded portion, B, has a beginning or initial delay, b, that lasts 150 ms, and an end or terminal delay, d, that lasts 125 ms. Again, these exemplary values are completely arbitrary and are being used for ease of discussion only. The actual sound or audio content of the second encoded portion B has a time duration of 10.1 seconds, and is labeled SOUND_B. Thus B=b+SOUND_B+d. If SOUND_A and SOUND_B were played consecutively, they would correspond directly to the original digital audio file. But because of the padding delays added by the encoder, the decoder cannot simply skip over the delays and decode only the audio content within each encoded portion, A, B.

Thus, two timers are used, a first timer, T1, and a second timer, T2, one for each of the encoded portions. Thus, if the digital audio file were divided into three encoded portions, three timers would be used; if the digital audio file were divided into four encoded portions, four timers would be used; and so forth. The first timer T1 can be viewed as the timer for the second encoded portion B, because the decoding of B "waits" until the expiration of the first timer T1 before decoding B. A first time interval of the first timer T1 corresponds to a time duration to fully decode the first encoded portion (A) reduced by the time delay (a) appended at the end of the first encoded portion A and by the time delay (b) introduced at the beginning of the second encoded portion B. Thus, T1=A−(a+b). In this example, T1 would have a time duration corresponding to 16.449 ms, 50 ms shorter than the time duration of SOUND_A.

The second timer T2 can be viewed as the timer for the first encoded portion A, because the decoding of A "waits" until the expiration of the second timer T2 before decoding A. A second time interval of the second timer T1 corresponds to a time duration to fully decode the second encoded portion (B) reduced by the time delay (c) introduced at the beginning of the first encoded portion (A) and by the time delay (d) appended at the end of the second encoded portion. Thus, T2=B−(d+c). In this example, T2 would have a time duration corresponding to 10.150 ms, 50 ms longer than the time duration of SOUND_B.

At time t0 shown in FIG. 4, a digital audio decoder, such as a conventional MP3 decoder, begins to decode a first encoded portion, A, of the digital audio file on a first audio track (Track 1). At the same time t0, the first timer T1 is started and continues to run while the first encoded portion A is being decoded. T1 runs for a time interval corresponding to a time interval to fully decode the first encoded portion A reduced by the padding delay a+c. At time t1, the first timer T1 stops or expires, whereupon the digital audio decoder (or another digital audio decoder) immediately begins to decode the second encoded portion B of the digital audio file on a second audio track (Track 2), distinct from Track 1. Also, starting at time t1, the second timer T2 begins to run. Note that the timer T2 starts at time t1 while SOUND_A is still being decoded. This is because the next encoded portion, B, has a starting padding delay of 150 ms, so the decoder needs to start decoding the next encoded portion B 150 ms before the SOUND_B portion is decoded. At time t2, after the last sample of SOUND_A is decoded, the first sample of SOUND_B is immediately decoded, thus creating a gapless sound between SOUND_A and SOUND_B. Thus, even though the original digital audio file was originally divided into two separately encoded portions, when played back using a decoder, there is no audible delay between the end of SOUND_A's playback and the start of SOUND_B's playback. The decoder continues to decode the end part of the first encoded portion A while the audio content portion (SOUND_B) of the second encoded portion is being decoded. This continues for 137 ms in this example after t2, but no silence is perceived between playback of the last sample of SOUND_A and the first sample of SOUND_B.

The second timer T2 can be viewed as being associated with the first encoded portion A, because the decoder waits T2 ms (in this example, 10.150 seconds) before beginning to decode A. At time t3, the second timer T2 expires (or the decoder stops waiting to decode the first encoded portion A) while the SOUND_B audio content is still being decoded. However, due to the presence of the starting padding delay (c) at the beginning of the first encoded portion A, the decoder needs to start decoding A 100 ms before the SOUND_B has finished decoding so that there is no silence gap between the playback of the last sample of SOUND_B and the first sample of SOUND_A.

Also at time 3, the first timer T1 is reset or is restarted so that it begins counting or waiting for 16.449 seconds. At time t4, the audio content (SOUND_A) of the first portion A begins decoding on Track 1, immediately after the last sample of SOUND_B has finished decoding. As a result, a seamless, gapping looping of the audio sound content in the original digital audio file is achieved, without any human-perceivable silence between the end of the audio sound and the beginning of the same audio sound when it is immediately replayed. This process continues repeatedly on alternate tracks until instructed to stop. An example of how the seamless, gapless looping can be used in a wagering game environment is described in connection with FIG. 5 below.

As used herein, the characterization of the timers as "running" is synonymous with having the next encoded portion to be decoded "waiting" for a delay period. These two concepts are synonymous, and the use of the term "timer" is not intended to restrict the aspects of the present disclosure to a stopwatch-type of timer. Rather, the digital audio decoder can be instructed to wait a delay period corresponding to T1 or T2 prior to decoding the next encoded portion of the digital audio file to be decoded. Conventionally, the digital audio decoder causes the decoded audio content to be played through one or more speakers, such as associated with a client device accessing a web page that accesses the encoded portions of the digital audio file. As perceived by a human, the repeated playback of the compressed audio content appears to be completely seamless, with no unintentional silence or gaps being heard between successive playbacks. The encoded portions A and B can be small in size, because they can be encoded using a lossy, audio compression format, and the client device that decodes and plays the audio portions does not need to have additional software other than a web browser. No special web browser plug-ins, add-ons, or software applications or applets need to be installed on the client device. Moreover, the encoded portions need to be encoded only once, and it is not necessary to do any preparation or manipulation of the raw digital audio file prior to encoding, though it can be preferred to ensure that the raw digital audio file itself does not have any gaps between playback loops before dividing it up into multiple portions and encoding each portion according to a digital audio compression format.

By seamless and gapless, it is meant that any silence (e.g., zero amplitude sound) that is added by the encoder is eliminated during looping playback such that playback of the encoded portions results in no perceivable (by the human ear) silence between playback of the encoded audio content of a digital audio file.

In some implementations, the audio content or sound corresponding to the encoded portions can be played in a seamless loop through one or more speakers, such as the audio speakers 16, while the web page portrays an animation within the webpage until the sound is interrupted or stopped. The timers T1 and T2 can be controlled by a web-based markup language or by a web-based compiled application using an object-oriented programming language. The web-based markup language can be based on HTML or a web-based scripting language, and the object-oriented programming language can be JAVA or C++, for example. The web-based compiled application can be ADOBE FLASH, for example.

Figure 5:
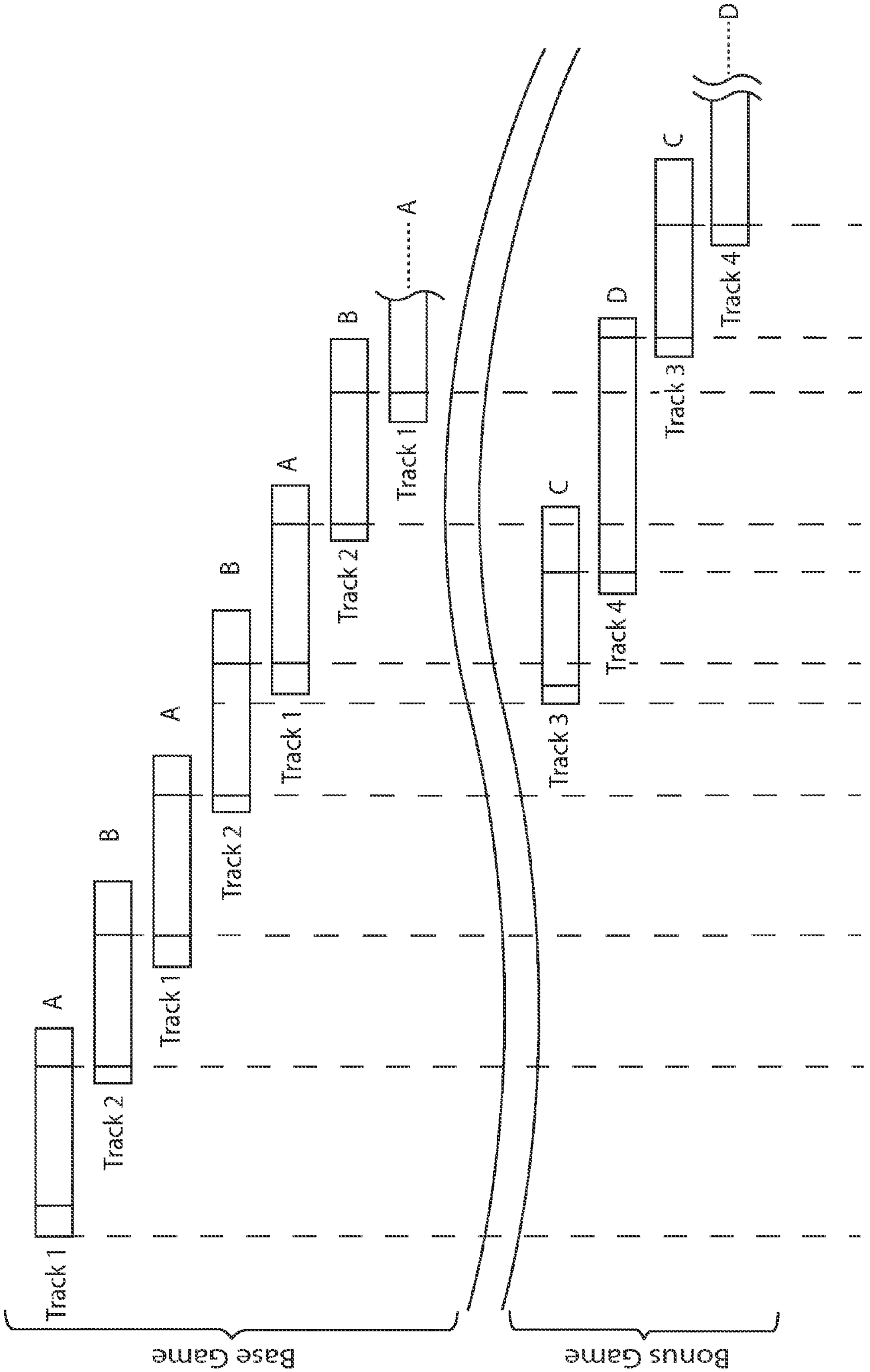
FIG. 5 is an exemplary timing diagram showing a timing sequence of seamlessly looping one audio sound during a base wagering game while simultaneously seamlessly looping another audio sound during a bonus game.

FIG. 5 is an exemplary timing chart of a digital audio sound being seamlessly looped during a base wagering game on two tracks while another digital audio sound is simultaneously seamlessly looped during a bonus game or round associated with or triggered by the base wagering game on two different tracks. The first digital audio sound is divided into two encoded portions, A and B, as described above, and the digital second audio sound is divided into two encoded portions, C and D, as described above. The timing sequence shows that during the base wagering game, the encoded portions A and B are decoded continuously on Track 1 and Track 2, respectively. When a bonus game or round is triggered, two encoded portions, C and D, corresponding to an audio sound relating to the bonus game are decoded on Track 3 and Track 4, respectively, while the base game sound on Tracks 1 and 2 continue to be seamlessly looped. Alternately, the base game sound on Tracks 1 and 2 can be halted or suspended until the completion of the bonus game or round. These aspects apply to any event that can occur in connection with a wagering game. Multiple seamlessly looped audio files can be played simultaneously on different tracks, while the wagering game is being conducted using a web browser on a client device.

Figure 6:
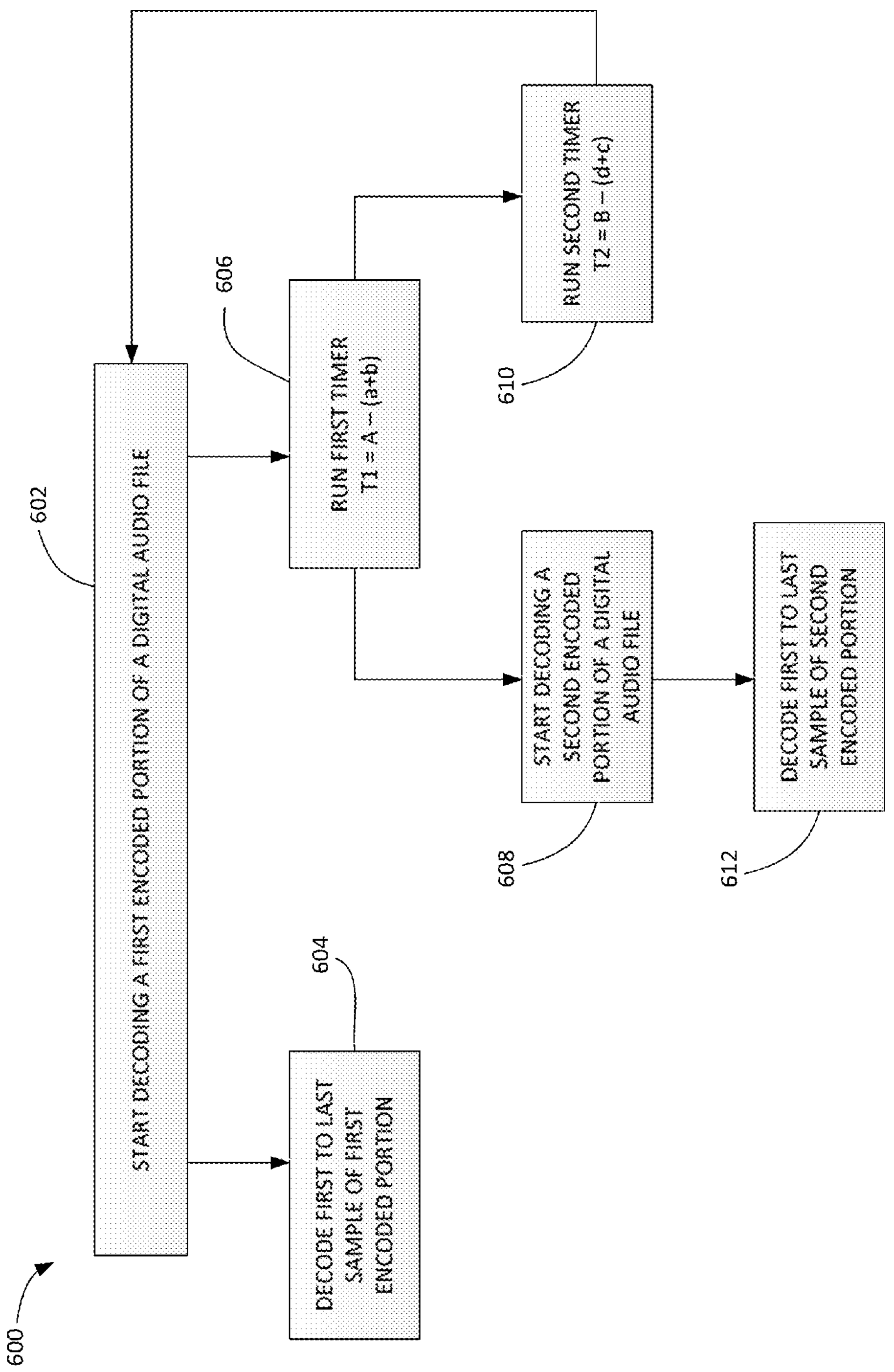
FIG. 6 is a flowchart for an algorithm that corresponds to instructions executed by a controller in accord with at least some aspects of the disclosed concepts.

FIG. 6, described by way of example above, represents an exemplary algorithm 600 that corresponds to at least some machine-readable instructions executed by the CPU 30 in FIG. 2 or any other suitable controller, such as on a client device operating a web browser, to perform the above described functions associated with the disclosed concepts. The use of the word "controller" or "processor" or "CPU" in this description or in the appended claims is not intended to invoke and explicitly does not invoke Paragraph 6 of Section 112 of Title 35 of the United States Code. The machine-readable instructions can be stored on one or more non-transitory storage media.

The algorithm 600 corresponds to a computer-implemented method of looping gapless playback of an audio sound seamlessly according to aspects described herein. The algorithm 600 begins by initiating decoding of a first encoded portion (e.g., A from FIG. 4) of a digital audio file, using a digital audio decoder, such as an MP3 decoder (602). Simultaneously, a first timer (e.g., T1 from FIG. 4) is started and then run for a first time interval corresponding to a time duration to fully decode the first encoded portion (e.g., A) reduced by a time delay appended at the end of the first encoded portion by an encoder that produced the first encoded portion (e.g., a from FIG. 4) and further reduced by a time delay introduced at the beginning of the second encoded portion (e.g., b from FIG. 4), or T1=A−(a+b) (606). While the timer T1 is running, the decoder decodes sequentially each sample of the first encoded portion (e.g., A, including SOUND_A) from the first to the last sample in the first encoded portion (604). Immediately upon the expiration of the first timer T1, the algorithm 600 initiates decoding the second encoded portion (e.g., B from FIG. 4) of the digital audio file (608). Simultaneously with starting the decoding of the second encoded portion (e.g., B), the algorithm 600 starts the second timer (e.g., T2 from FIG. 4) and allows it to run for a second time interval corresponding to a time duration to fully decode the second encoded portion (e.g., B) reduced by a time delay introduced at the beginning of the first encoded portion (e.g., c from FIG. 4) and further reduced by a time delay appended at the end of the second encoded portion (e.g., d from FIG. 4), or T2=B−(c+d) (610). The decoder decodes the second encoded portion (e.g., B, including SOUND_B) from the first to the last sample in the second encoded portion (612). When the second timer expires (610), the algorithm 600 loops back to block 602 to immediately begin decoding the first encoded portion (e.g., A), again, and so forth until the algorithm 600 is halted or suspended.

Thus, the time duration corresponding to the first encoded portion (e.g., A) represents the time to fully decode the first encoded portion. Likewise, the time duration corresponding to the second encoded portion (e.g., B) represents the time to fully decode the second encoded portion.

Although in these aspects, each of the encoded portions have both a delay added by an encoder at the beginning of each file (e.g., c or b shown in FIG. 4) and a delay added by an encoder at the end of each file (e.g., a or d shown in FIG. 4). However, the aspects of the present disclosure also work equally well with an encoded file that has only a delay either at the beginning or at the end of the encoded files. For example, c can be 0 ms (e.g., non-existent) and b can be 0 ms. Likwise, a can be 0 and d can be 0. Or, c can be 0 and d can be 0. Or, a can be 0 and b can be 0.

While the seamless, gapless looping aspects of the present disclosure are well suited for wagering games because of a player's acute intolerance for sound anomalies as detracting from an exciting wagering game experience and because of the advantages of using small compressed audio files, particularly in connection with wagering games played on a web browser, they are not so limited. Rather, they can be used in any application in which gapless, seamlessly looping audio playback is desired, preferably using multiple compressed, encoded digital audio files.

Each of these embodiments and obvious variations thereof is contemplated as falling within the spirit and scope of the claimed invention, which is set forth in the following claims. Moreover, the present concepts expressly include any and all combinations and subcombinations of the preceeding elements and aspects.

While this disclosure is susceptible of embodiments in many different forms, there is shown in the drawings and described in detail herein various embodiments of the present disclosure with the understanding that the present disclosure is to be considered as an exemplification of the principles of the inventions described herein and is not intended to limit the broad aspect of the disclosure to the embodiments illustrated.

What is claimed is:

1. A computer-implemented method of looping gapless playback of an audio sound seamlessly using one or more controllers, the method comprising the steps of:

initiating, by any of the one or more controllers, decoding, by a digital audio decoder, a first encoded portion of a digital audio file comprising at least the first encoded portion and a second encoded portion;

running a first timer operated by any of the one or more controllers, simultaneously while decoding the first encoded portion, for a first time interval corresponding to a time duration to fully decode the first encoded portion reduced (a) by a time delay appended at the end of the first encoded portion by an encoder that produced the first encoded portion and (b) by a time delay introduced at the beginning of the second encoded portion;

immediately upon expiration of the first timer, initiating, by any of the one or more controllers, decoding, by the digital audio decoder or another digital audio decoder, the second encoded portion; and running a second timer operated by any of the one or more controllers, simultaneously while decoding the second encoded portion, for a second time interval corresponding to a time duration to fully decode the second encoded portion reduced (a) by a time delay introduced at the beginning of the first encoded portion and (b) by a time delay appended at the end of the second encoded portion.

2. The method of claim 1, further comprising:

immediately upon expiration of the second timer, initiating decoding, by the digital audio decoder, the first encoded portion without introducing any encoder-induced silence between the expiration of the decoding of audio content in the second encoded portion and the initiation of the decoding of audio content in the first encoded portion to produce gapless playback of the audio content in the second encoded portion immediately followed by the audio content in the first encoded portion.

3. The method of claim 1, further comprising:

displaying on a video display, using a web browser, a web page that portrays an animation while an audio sound corresponding to at least the first encoded portion and the second encoded portion is played in a seamless loop through one or more speakers until interrupted or stopped.

4. The method of claim 1, wherein the decoding of the first encoded portion is carried out on a first audio track and the decoding of the second encoded portion is carried out on a second audio track distinct from the first audio track.

5. The method of claim 1, wherein the digital audio file is formatted according to a lossless, uncompressed digital audio format, wherein each of the first encoded portion and the second encoded portion is encoded according to a lossy, compressed digital audio format, wherein the first and second timers are controlled by a web-based markup language or a web-based compiled application using an object-oriented programming language.

6. The method of claim 5, wherein the digital audio format is the Waveform Audio File Format (WAV) or the Audio Interchange File Format (AIFF) or the Free Lossless Audio Codec (FLAC) format, and the lossy, compressed digital audio format is the MP3 format.

7. The method of claim 5, wherein the web-based markup language is based on HTML or a web-based scripting language, or the object-oriented programming language is JAVA, or the web-based compiled application is ADOBE FLASH.

8. The method of claim 1, further comprising:

initiating a wagering game; and during at least a portion of the wagering game, causing the decoded first encoded portion and the decoded second encoded portion to be played continuously through one or more speakers.

9. The method of claim 8, further comprising:

in response to triggering a bonus game during the wagering game, stopping playback of whichever of the first encoded portion or the second encoded portion is currently being played during the wagering game and causing a second digital audio file to be played continuously through the one or more speakers using the method of claim 1.

10. The method of claim 8, further comprising:

in response an occurrence of an event during the wagering game, causing encoded portions of a second digital audio file to be played continuously through the one or more speakers using the method of claim 1 as the first or the second encoded portion of the digital audio file is also being played, where the encoded portions of the second digital audio file are decoded using at least a third audio track and a fourth audio track.

11. The computer-implemented method of claim 1, wherein the digital audio decoder or another digital audio decoder corresponds to at least one of the one or more controllers.

12. One or more physical, non-transitory, machine-readable storage media including instructions which, when executed by one or more processors, cause the one or more processors to perform operations comprising:

starting a first timer for a first time interval by any of the one or more processors;

simultaneously with starting the first timer, initiating playback by any of the one or more processors then playing a first encoded portion of a digital audio file that is divided up into the first encoded portion and at least a second encoded portion, the first encoded portion having an initial delay and a terminal delay added during encoding of the first encoded portion, the second encoded portion having an initial delay and a terminal delay added during encoding of the second encoded portion;

immediately upon expiration of the first timer, starting a second timer for a second time interval and initiating playback by any of the one or more processors then playing the second encoded portion of the digital audio file, where the first time interval equals the time to fully decode by any of the one or more processors the first encoded portion minus the terminal delay of the first encoded portion minus the initial delay of the second encoded portion, and where the second time interval equals the time to fully decode by any of the one or more processors the second encoded portion minus the terminal delay of the second encoded portion minus the initial delay of the first encoded portion.

13. The one or more storage media of claim 12, wherein the operations further include, immediately upon expiration of the second timer, initiating playback then playing the audio content in the first encoded portion without introducing any encoder-induced silence between the expiration of the playing of the audio content in the second encoded portion and the initiation of the playback of the audio content in the first encoded portion to produce gapless playback of the audio content in the second encoded portion immediately followed by the audio content in the first encoded portion.

14. The one or more storage media of claim 12, wherein the playing of the first encoded portion is carried out on a first audio track and the playing of the second encoded portion is carried out on a second audio track distinct from the first audio track.

15. The one or more storage media of claim 12, wherein the operations further include:

initiating a wagering game; and during the wagering game, causing the decoded first encoded portion and the decoded second encoded portion to be played continuously through one or more speakers.

16. The one or more storage media of claim 15, wherein the operations further include:

in response to triggering a bonus game during the wagering game, stopping playback of whichever of the first encoded portion or the second encoded portion is currently being played and causing a second digital audio file to be played continuously through the one or more speakers using the method of claim 1.

17. The one or more storage media of claim 15, wherein the operations further include:

in response an occurrence of an event during the wagering game, causing encoded portions of a second digital audio file to be played continuously through the one or more speakers using the operations of claim 12 as the first or the second encoded portion of the digital audio file is also being played, where the encoded portions of the second digital audio file are played on at least a third audio track and a fourth audio track.

18. A computer-implemented method of looping an audio sound seamlessly, comprising playing repeatedly by one or more controllers the audio portion only of a digital audio file that is divided into multiple encoded MP3 files, each of the MP3 files having delay added at the beginning and at the end of each file during encoding of the MP3 file and being played on different audio tracks, wherein the playing includes:

initiating decoding of a first of the encoded MP3 files;

running a first timer, simultaneously while the first encoded MP3 file is being decoded, for a first time interval corresponding to a time duration to fully decode the first encoded MP3 file reduced (a) by a time delay appended at the end of the first encoded MP3 file during the encoding thereof and (b) by a time delay introduced at the beginning of a second of the encoded MP3 files;

immediately upon expiration of the first timer, initiating decoding of the second encoded MP3 file; and running a second timer, simultaneously while the second encoded MP3 file is being decoded, for a second time interval corresponding to a time duration to fully decode the second encoded MP3 file reduced (a) by a time delay introduced at the beginning of the first encoded MP3 file and (b) by a time delay appended at the end of the second encoded MP3 file during the encoding thereof.

19. The computer-implemented method of claim 17, wherein the MP3 files includes a first MP3 file and a second MP3 file, the method further comprising delaying playback of the second MP3 file based on the delay added at the end of the first MP3 file and the delay added at the beginning of the second MP3 file.

20. The computer-implemented method of claim 19, further comprising delaying re-playback of the first MP3 file following playback of the second MP3 file based on the delay added at the end of the second MP3 file and the delay added at the beginning of the first MP3 file.

21. The computer-implemented method of claim 19, further comprising:

initiating a wagering game; and during at least a portion of the wagering game, repeatedly and continuously playing in a looping sequence each of the MP3 files through one or more speakers.

* * * * *